(12) United States Patent
Käsmayr et al.

(10) Patent No.: US 8,466,247 B2
(45) Date of Patent: Jun. 18, 2013

(54) FORMALDEHYDE-FREE BINDERS FOR PRODUCING WOOD PRODUCTS

(75) Inventors: Daniel Käsmayr, Ludwigshafen (DE); Samira Nozari, Mannheim (DE)

(73) Assignee: BASF SE (DE)

( * ) Notice: Subject to any disclaimer, the term of this patent is extended or adjusted under 35 U.S.C. 154(b) by 227 days.

(21) Appl. No.: 12/866,987

(22) PCT Filed: Feb. 11, 2009

(86) PCT No.: PCT/EP2009/051554
§ 371 (c)(1),
(2), (4) Date: Aug. 10, 2010

(87) PCT Pub. No.: WO2009/101100
PCT Pub. Date: Aug. 20, 2009

(65) Prior Publication Data
US 2011/0009530 A1    Jan. 13, 2011

(30) Foreign Application Priority Data

Feb. 11, 2008    (EP) .................................... 08151282

(51) Int. Cl.
*C08L 97/00* (2006.01)
*C08L 97/02* (2006.01)

(52) U.S. Cl.
USPC ............. 527/103; 524/13; 524/735; 427/212; 264/331.18

(58) Field of Classification Search
USPC ................... 524/13, 735; 527/103; 264/331.8
See application file for complete search history.

(56) References Cited

U.S. PATENT DOCUMENTS

| | | | |
|---|---|---|---|
| 3,784,396 A * | 1/1974 | Fourment et al. | 427/195 |
| 3,998,768 A | 12/1976 | Pettit, Jr. | |
| 6,099,773 A | 8/2000 | Reck et al. | |
| 6,348,530 B1 | 2/2002 | Reck et al. | |
| 6,596,386 B1 | 7/2003 | Reck et al. | |
| 7,323,242 B2 | 1/2008 | Gerst et al. | |
| 2008/0142436 A1 | 6/2008 | Bothe et al. | |
| 2008/0265222 A1* | 10/2008 | Ozersky et al. | 252/607 |
| 2009/0085240 A1* | 4/2009 | Elizalde et al. | 264/134 |
| 2010/0010143 A1 | 1/2010 | Elizalde et al. | |
| 2011/0009530 A1 | 1/2011 | Kasmayr et al. | |

FOREIGN PATENT DOCUMENTS

| | | |
|---|---|---|
| CA | 2035355 A1 | 8/1991 |
| CA | 2391508 A1 | 5/2001 |
| DE | 2306771 A1 | 8/1974 |
| DE | 7440894 U | 4/1975 |
| DE | 2832509 B1 | 1/1980 |
| DE | 4003422 A1 | 8/1991 |
| DE | 19606393 A1 | 8/1997 |
| DE | 19729161 A1 | 1/1999 |
| DE | 19956420 C1 | 3/2001 |
| DE | 10253498 A1 | 7/2003 |
| EP | 0012169 A1 | 6/1980 |
| EP | 0346864 A2 | 12/1989 |
| EP | 0699510 A2 | 3/1996 |
| WO | WO-97/31059 A1 | 8/1997 |
| WO | WO-03/035778 A2 | 5/2003 |
| WO | WO-2006/082223 A1 | 8/2006 |
| WO | WO 2007/024020 * | 3/2007 |
| WO | WO2007/122089 * | 11/2007 |
| WO | WO-2007/122089 A1 | 11/2007 |
| WO | WO-2008/095900 A1 | 8/2008 |

OTHER PUBLICATIONS

Dunky, et al., Holzwerkstoffe und Leime (2002), pp. 91-157, Springer-Verlag Berlin Heidelberg, Germany.
U.S. Appl. No. 13/119,882, filed Mar. 18, 2011, Kasmayr et al.

* cited by examiner

*Primary Examiner* — James J Seidleck
*Assistant Examiner* — Deve E Valdez
(74) *Attorney, Agent, or Firm* — Novak Druce Connolly Bove + Quigg LLP

(57) ABSTRACT

A lignocellulose-containing material, obtainable by treating lignocellulose particles A with a binder B, the binder B comprising the following components:
  An aqueous component (I) comprising
    (i) a polymer A which is composed of the following monomers:
      a) from 80 to 100% by weight of at least one ethylenically unsaturated mono- and/or dicarboxylic acid (monomer(s) A1) and
      b) from 0 to 20% by weight of at least one further ethylenically unsaturated monomer which differs from the monomers A1 (monomer(s) A2) and
    ii) a low molecular weight crosslinking agent having at least two functional groups which are selected from the group consisting of hydroxyl, carboxylic acid and derivatives thereof, primary, secondary and tertiary amine, epoxy and a component (II) as an aqueous dispersion comprising one or more polymer(s) M which are composed of the following monomers:
      a) from 0 to 50% by weight of at least one ethylenically unsaturated monomer which comprises at least one epoxide group and/or hydroxyalkyl group (monomer(s) M1), and
      b) from 50 to 100% by weight of at least one further ethylenically unsaturated monomer which differs from the monomers M1 (monomer(s) M2) and optionally customary additives as component (III).

18 Claims, No Drawings

FORMALDEHYDE-FREE BINDERS FOR PRODUCING WOOD PRODUCTS

CROSS-REFERENCE TO RELATED APPLICATIONS

This application is a national stage application (under 35 U.S.C. §371) of PCT/EP2009/051554, filed Feb. 11, 2009, which claims benefit of European application 08151282.4, filed Feb. 11, 2008.

BACKGROUND OF THE INVENTION

The present invention relates to a lignocellulose-containing material obtainable by treating lignocellulose A with a binder B as defined in the claims.

The present invention furthermore relates to moldings comprising a lignocellulose-containing material, a process for the production of the lignocellulose-containing material, a process for the production of moldings using the lignocellulose-containing material, the use of the lignocellulose-containing material for the production of moldings and the use of the moldings for the production of pieces of furniture and of packaging materials, in house construction or in interior finishing or in motor vehicles.

Materials based on lignocellulose are known. Important examples of lignocellulose-containing materials are wood parts, such as wood layers, wood strips, wood chips or wood fibers, it also being possible for the wood fibers to originate from wood fiber-containing plants, such as flax, hemp, sunflowers, topinambur or rape. Starting materials for such wood parts or wood particles are usually timbers from the thinning of forests, residual industrial timbers and used woods and wood fiber-containing plants.

The processing to give the desired lignocellulose-containing materials, such as wood particles, is effected by known processes, cf. for example M. Dunky, P. Niemt, Holzwerkstoffe and Leime, pages 91-156, Springer Verlag, Heidelberg, 2002.

Lignocellulose-containing moldings, also referred to here as wood-base materials in the case of wood as lignocellulose, are an economical and resource-protecting alternative to solid wood of considerable importance in particular in furniture construction and as building materials. As a rule, wood layers of different thickness, wood strips, wood chips or wood fibers from various timbers serve as starting materials for wood-base materials. Such wood parts or wood particles are usually compressed at elevated temperature with natural and/or synthetic binders and, if appropriate, with addition of further additives to give board- or strand-like wood-base materials. Examples of such lignocellulose-containing moldings or wood-base materials are medium density fiber boards (MDF), woodchip materials, such as particle boards and coarse particle boards (OSB, oriented strand board), plywood, such as veneer plywood, and glued wood.

Binders used are as a rule formaldehyde-containing binders, for example urea-formaldehyde resins or melamine-containing urea-formaldehyde resins. The resins are prepared by polycondensation of formaldehyde with urea and/or melamine. The use of such formaldehyde resins can result in the presence of free formaldehyde in the finished wood-base material. Additional formaldehyde may be liberated by hydrolysis of the polycondensates. The free formaldehyde present in the wood-base material and the formaldehyde liberated by hydrolysis during the life of the wood-base material can be released to the environment.

Above certain limits, formaldehyde may cause allergies and irritation of skin, respiratory tract or eyes in humans. The reduction of the formaldehyde emission in components, especially in the interior, is therefore an important challenge.

Certain formaldehyde-free aqueous binders—inter alia for wood fibers—based on polymers of ethylenically unsaturated carboxylic acids are described in the prior art:

WO 97/31059 A1 (BASF Aktiengesellschaft) describes the use of a formaldehyde-free, aqueous binder comprising A) polycarboxylic acid and B) an alkanolamine having at least two hydroxyl groups as a binder for fibers, shavings or chips for the production of moldings. In the examples, an aqueous solution of an 80 acrylic acid/20 maleic acid copolymer is described as component A) and triethanolamine is described as component B) and the use of the corresponding binder for the production of wood particle boards is described.

DE 102 53 498 A1 (BASF Aktiengesellschaft) describes an aqueous polymer dispersion which is obtainable by aqueous emulsion polymerization of, for example, acrylate and styrene monomers in the presence of a polymer A2, for example based on a copolymer of acrylic acid/maleic anhydride/unsaturated amine component. The aqueous polymer dispersion thus obtainable is used for structural wood gluing.

WO 2006/82223 A1 (BASF Aktiengesellschaft) describes a certain aqueous polymer dispersion obtainable by free radical emulsion polymerization, formed, for example, by polymerization of the monomers methacrylic acid, N-methylolacrylamide, methyl methacrylate, styrene and n-butyl acrylate. Use of such polymer dispersions as binders for cellulosic fibers for the production of filter materials or as base paper for decorative sheets is claimed.

WO 2007/122089 A1 (BASF Aktiengesellschaft) describes an aqueous polymer composition which is obtainable by free radical aqueous emulsion polymerization of, for example, acrylic acid and acrylate and styrene monomers in the presence of a polymer A2, for example based on an acrylic acid homopolymer. The aqueous polymer dispersion thus obtainable is used in the examples as a binder for pressed test specimens comprising hemp/flax fiber mats.

The binders described in the prior art may well be formaldehyde-free but still leave room for improvements, for example with regard to mechanical load capacities (for example transverse tensile strength) or behavior toward water (for example swelling) of the moldings produced with them.

BRIEF SUMMARY OF THE INVENTION

The object of the present invention was accordingly to overcome the disadvantages shown in the prior art. In particular, it was intended to provide formaldehyde-free binders which lead to good mechanical properties, such as transverse tensile strength, and at the same time good water tolerance (for example expressed by low swelling values) of the wood-base materials. In addition, such a binder should be economical to prepare and capable of being easily processed.

The object was achieved by a lignocellulose-containing material obtainable by treating lignocellulose particles A with a binder B, the binder B comprising the following components:

an aqueous component (I) comprising (i) a polymer A which is composed of the following monomers:

a) from 80 to 100% by weight of at least one ethylenically unsaturated mono- and/or dicarboxylic acid (monomer(s) A1) and b) from 0 to 20% by weight of at least one further ethylenically unsaturated monomer which differs from the monomers A1 (monomer(s) A2) and optionally (ii) a low molecular weight crosslinking agent having at least two functional groups which are selected from the group consisting of hydroxyl, carboxylic acid and derivatives thereof, primary, secondary and tertiary amine, epoxy, and a component (II) as an aqueous dispersion comprising one or more polymer(s) M, which is composed of the following monomers:

a) from 0 to 50% by weight of at least one ethylenically unsaturated monomer which comprises at least one epoxide group and/or at least one hydroxyalkyl group (monomer(s) M1), and b) from 50 to 100% by weight of at least one further ethylenically unsaturated monomer which differs from the monomers M1 (monomer(s) M2)

and optionally customary additives as component (III).

DETAILED DESCRIPTION OF THE INVENTION

The term lignocellulose is known to the person skilled in the art. Important examples of lignocellulose particles A are wood particles, such as wood layers, wood strips, wood chips or wood fibers, it also being possible for the wood fibers to originate optionally from wood fiber-containing plants, such as flax, hemp, sunflowers, topinambur or rape.

Wood particles, in particular wood fibers or wood chips, are preferred as lignocellulose particles A.

The binder B comprises:

an aqueous component (I) comprising (i) a polymer A which is composed of the following monomers:

a) from 80 to 100% by weight of at least one ethylenically unsaturated mono- and/or dicarboxylic acid (monomer(s) A1) and b) from 0 to 20% by weight of at least one further ethylenically unsaturated monomer which differs from the monomers A1 (monomer(s) A2)

and optionally (ii) a low molecular weight crosslinking agent having at least two functional groups which are selected from the group consisting of hydroxyl, carboxylic acid and derivatives thereof, primary, secondary and tertiary amine, epoxy, and a component (II) as an aqueous dispersion comprising one or more polymer(s) M which is composed of the following monomers:

a) from 0 to 50% by weight of at least one ethylenically unsaturated monomer which comprises at least one epoxide group and/or at least one hydroxyalkyl group (monomer(s) M1), and b) from 50 to 100% by weight of at least one further ethylenically unsaturated monomer which differs from the monomers M1 (monomer(s) M2)

and optionally customary additives as component (III).

The polymer A is composed of the following monomers:

a) from 80 to 100% by weight of at least one ethylenically unsaturated mono- and/or dicarboxylic acid (monomer(s) A1) and b) from 0 to 20% by weight of at least one further ethylenically unsaturated monomer which differs from the monomers A1 (monomer(s) A2).

The preparation of polymers A is familiar to the person skilled in the art and is affected in particular by free radical solution polymerization, for example in water or in an organic solvent (cf. for example A. Echte, Handbuch der Technischen Polymerchemie, Chapter 6, VCH, Weinheim, 1993, or B. Vollmert, Grundriss der Makromolekularen Chemie, Volume 1, E. Vollmert Verlag, Karlsruhe, 1988).

Suitable monomers A1 are in particular $\alpha,\beta$-monoethylenically unsaturated mono- and dicarboxylic acids which have 3 to 6 carbon atoms, possible anhydrides thereof and water-soluble salts thereof, in particular alkali metal salts thereof, such as, for example, acrylic acid, methacrylic acid, maleic acid, fumaric acid, itaconic acid, citraconic acid, tetrahydrophthalic acid or anhydrides thereof, such as, for example, maleic anhydride, and the sodium or potassium salts of the abovementioned acids. Acrylic acid, methacrylic acid and/or maleic anhydride are particularly preferred, acrylic acid and the binary combinations of acrylic acid and maleic anhydride or acrylic acid and maleic acid being particularly preferred.

Suitable monomer(s) A2 are ethylenically unsaturated compounds which can be subjected to free radical copolymerization in a simple manner with monomer(s) A1, for example ethylene; vinylaromatic monomers, such as styrene, $\alpha$-methylstyrene, o-chlorostyrene or vinyltoluenes; vinyl halides, such as vinyl chloride or vinylidene chloride; esters of vinyl alcohol and monocarboxylic acids having 1 to 18 carbon atoms, such as vinyl acetate, vinyl propionate, vinyl n-butyrate, vinyl laurate and vinyl stearate; esters of $\alpha,\beta$-monoethylenically unsaturated mono- and dicarboxylic acids preferably having 3 to 6 carbon atoms, such as, in particular, acrylic acid, methacrylic acid, maleic acid, fumaric acid and itaconic acid with alkanols having in general 1 to 12, preferably 1 to 8 and in particular 1 to 4 carbon atoms, such as, in particular, methyl, ethyl, n-butyl, isobutyl, pentyl, hexyl, heptyl, octyl, nonyl, decyl and 2-ethylhexyl acrylate and methacrylate and dimethyl or di-n-butyl fumarate and maleate; nitriles of $\alpha,\beta$-monoethylenically unsaturated carboxylic acids, such as acrylonitrile, methacrylonitrile, fumaronitrile, maleonitrile, and conjugated $C_{4-8}$-dienes, such as 1,3-butadiene (butadiene) and isoprene. As a rule, said monomers form the main monomers which, based on the total amount of monomers A2, together account for a proportion of $\geq 50\%$ by weight, preferably $\geq 80\%$ by weight and particularly preferably $\geq 90\%$ by weight or even form the total amount of the monomers A2. As a rule, these monomers have only a moderate to low solubility in water under standard conditions (20° C., 1 atm (absolute)).

Further monomers A2, which however have the higher water solubility under the abovementioned conditions, are those which comprise at least one sulfo group and/or the corresponding anion thereof or at least one amino, amido, ureido or N-heterocyclic group and/or the ammonium derivatives thereof which are protonated or alkylated under nitrogen. Acrylamide and methacrylamide may be mentioned by way of example; furthermore vinylsulfonic acid, 2-acrylamido-2-methylpropanesulfonic acid, styrenesulfonic acid and the water-soluble salts thereof and N-vinylpyrrolidone; 2-vinylpyridine, 4-vinylpyridine, 2-vinylimidazole; 2-(N,N-dimethylamino)ethyl acrylate, 2-(N,N-dimethylamino)ethyl methacrylate, 2-(N,N-diethylamino)ethyl acrylate, 2-(N,N-diethylamino)ethyl methacrylate, 2-(N-tert-butylamino) ethyl methacrylate, N-(3-N',N'-dimethylaminopropyl)methacrylamide and 2-(1-imidazolin-2-onyl)ethyl methacrylate.

Usually, the abovementioned water-soluble monomers A2 are present only as modifying monomers in amounts of $\leq 10\%$ by weight, preferably $\leq 5\%$ by weight and particularly preferably $\leq 3\%$ by weight, based on the total amount of monomers A2.

Further monomers A2 which usually increase the internal strength of the films of a polymer matrix usually have at least one epoxy, hydroxyl, N-methylol or carbonyl group or at least two nonconjugated ethylenically unsaturated double bonds.

Examples of these are monomers having two vinyl radicals, monomers having two vinylidene radicals and monomers having two alkenyl radicals. Particularly advantageous are the diesters of dihydric alcohols with α,β-monoethylenically unsaturated monocarboxylic acids, among which acrylic and methacrylic acid are preferred. Examples of such monomers having two nonconjugated ethylenically unsaturated double bonds are alkylene glycol diacrylates and dimethacrylates, such as ethylene glycol diacrylate, 1,2-propylene glycol diacrylate, 1,3-propylene glycol diacrylate, 1,3-butylene glycol diacrylate, 1,4-butylene glycol diacrylates and ethylene glycol dimethacrylate, 1,2-propylene glycol dimethacrylate, 1,3-propylene glycol dimethacrylate, 1,3-butylene glycol dimethacrylate, 1,4-butylene glycol dimethacrylate, and divinylbenzene, vinyl methacrylate, vinyl acrylate, allyl methacrylate, allyl acrylate, diallyl maleate, diallyl fumarate, methylenebisacrylamide, cyclopentadienyl acrylate, triallyl cyanurate or triallyl isocyanurate. The $C_1$-$C_8$-hydroxyalkyl esters of methacrylic acid and acrylic acid, such as n-hydroxyethyl, n-hydroxypropyl or n-hydroxybutyl acrylate and methacrylate, and compounds such as diacetoneacrylamide and acetylacetoxyethyl acrylate or methacrylate, are also of particular importance in this context.

The abovementioned crosslinking monomers A2 are frequently used in amounts of ≦0% by weight, but preferably in amounts of ≦5% by weight, based in each case on the total amount of monomers A2. Particularly preferably, however, no such crosslinking monomers A2 at all are used for the preparation of the polymer A.

According to the invention, the proportion of monomers A2 incorporated in the form of polymerized units in the polymer A is advantageously ≦10% by weight or ≦5% by weight.

Particularly advantageously, the polymer A comprises no monomers A2 at all which are incorporated in the form of polymerized units.

Preferred polymers A are obtainable by free radical solution polymerization of only monomers A1, particularly preferably from 65 to 100% by weight, particularly preferably from 70 to 90% by weight, of acrylic acid with particularly preferably from 0 to 35% by weight, very particularly preferably from 10 to 30% by weight, of maleic acid or maleic anhydride.

Advantageously, polymer A has a weight average molecular weight Mw in the range from 1000 g/mol to 100,000 g/mol.

Establishing the weight average molecular weight Mw in the preparation of polymer A is familiar to a person skilled in the art and is advantageously effected by free radical aqueous solution polymerization in the presence of free radical chain-like transfer compounds, the so-called free radical chain transfer agents. The determination of the weight-average molecular weight Mw, too, is familiar to a person skilled in the art and is effected, for example, by means of gel permeation chromatography.

Suitable commercial products for polymers A are, for example, the Sokalan® products of BASF SE, which, for example, are based on acrylic acid and/or maleic acid.

Optionally, the component (I) comprises a low molecular weight crosslinking agent (ii) having at least two functional groups which are selected from the group consisting of hydroxyl, carboxylic acid and derivatives thereof, primary, secondary and tertiary amine, epoxy.

Suitable crosslinking agents of this type are those having a molecular weight in the range from 30 to 500 g/mol. The following may be mentioned by way of example: alkanolamines, such as triethanolamine; carboxylic acids, such as citric acid, tartaric acid, butanetetracarboxylic acid; alcohols, such as sugars, for example fructose, glucose, saccharose, sorbitol or molasses, or such as glycerol, glycol; epoxides, such as bisphenol A or bisphenol F.

In one embodiment, the component (I) comprises no such low molecular weight crosslinking agent (ii).

In a further embodiment, the binder B, preferably the component (I), comprises a low molecular weight crosslinking agent (ii) having at least two functional hydroxyl groups.

In a further embodiment, the binder B, preferably the component (I), comprises a low molecular weight crosslinking agent (ii) having a molecular weight in the range from 30 to 500 g/mol and having at least two functional hydroxyl groups.

In a further embodiment, the binder B, preferably the component (I), comprises a low molecular weight crosslinking agent (ii) having a molecular weight in the range from 30 to 500 g/mol, which is a sugar, preferably fructose, glucose, saccharose, sorbitol or molasses.

The amount of the low molecular weight crosslinking agent (ii) in the abovementioned embodiments is in the range from 1% by weight to 100% by weight, preferably from 5% by weight to 50% by weight, based in each case on the sum of the components (I) and (II) as pure, undiluted substance or as solid.

Polymer M is composed of the following monomers:
a) from 0 to 50% by weight of at least one ethylenically unsaturated monomer which comprises at least one epoxide group and/or at least one hydroxyalkyl group (monomer(s) M1), and
b) from 50 to 100% by weight of at least one further ethylenically unsaturated monomer which differs from the monomers M1 (monomer(s) M2).

Polymer M is obtainable by free radical emulsion polymerization in an aqueous medium of the corresponding monomers M1 and/or M2. Polymer M may be present as a single phase or as a plurality of phases and may have a core/shell morphology.

The procedure for free radical emulsion polymerizations of ethylenically unsaturated monomers in an aqueous medium has been widely described before and is therefore sufficiently well known to the person skilled in the art (cf. for example: Emulsion polymerization in Encyclopedia of Polymer Science and Engineering, Vol. 8, page 659 et seq. (1987); D. C. Blackley, in High Polymer Latices, Vol. 1, page 35 et seq. (1966); H. Warson, The Applications of Synthetic Resin Emulsions, Chapter 5, page 246 et seq. (1972); D. Diederich, Chemie in unserer Zeit 24, pages 135 to 142 (1990); Emulsion Polymerisation, Interscience Publishers, New York (1965); DE-A 40 03 422 and Dispersionen synthetischer Hochpolymerer, F. Hölscher, Springer-Verlag, Berlin (1969)).

The free radical aqueous emulsion polymerization reactions are usually effected in such a way that the ethylenically unsaturated monomer is dispersed in the aqueous medium in the form of monomer droplets with the concomitant use of dispersants and is polymerized by means of a free radical polymerization initiator.

Particularly suitable monomer(s) M1 are glycidyl acrylate and/or glycidyl methacrylate and hydroxyalkyl acrylates and methacrylates having $C_2$ to $C_{10}$-hydroxyalkyl groups, in particular $C_2$ to $C_4$-hydroxyalkyl groups and preferably $C_2$- and $C_3$-hydroxyalkyl groups, for example 2-hydroxyethyl acrylate, 2-hydroxyethyl methacrylate, 3-hydroxypropyl acrylate, 3-hydroxypropyl methacrylate, 4-hydroxybutyl acrylate and/or 4-hydroxybutyl methacrylate. Particularly advantageously, one or more, preferably one or two, of the following monomers M1 are used: 2-hydroxyethyl acrylate, 2-hydroxyethyl methacrylate, glycidyl acrylate, glycidyl methacrylate.

According to the invention, it is possible, if necessary, initially to take a portion of the total amount of monomers M1 in the polymerization vessel. However, it is also possible to meter in the total amount or any remaining residual amount of monomers M1 during the polymerization reaction. The total amount or any remaining residual amount of monomers M1 can be metered into the polymerization vessel batchwise in one or more portions or continuously at constant or varying flow rates. Particularly advantageously, the metering of the monomers M1 during the polymerization reaction is effected continuously at constant flow rates, in particular as a constituent of an aqueous monomer emulsion.

Particularly suitable monomer(s) M2 are ethylenically unsaturated compounds which can be subjected to free radical copolymerization in a simple manner with monomer(s) M1 (for example ethylene; vinylaromatic monomers, such as styrene, $\alpha$-methylstyrene, o-chlorostyrene or vinyltoluenes; vinyl halides, such as vinyl chloride or vinylidene chloride; esters of vinyl alcohol and monocarboxylic acids having 1 to 18 carbon atoms, such as vinyl acetate, vinyl propionate, vinyl n-butyrate, vinyl laurate and vinyl stearate; esters of $\alpha,\beta$-monoethylenically unsaturated mono- and dicarboxylic acids preferably having 3 to 6 carbon atoms, such as, in particular, acrylic acid, methacrylic acid, maleic acid, fumaric acid and itaconic acid, with alkanols having in general 1 to 12, preferably 1 to 8 and in particular 1 to 4 carbon atoms, such as, in particular, methyl, ethyl, n-butyl, isobutyl, pentyl, hexyl, heptyl, octyl, nonyl, decyl and 2-ethylhexyl acrylate and methacrylate, dimethyl or di-n-butyl fumarate and maleate; nitriles of $\alpha,\beta$-monoethylenically unsaturated carboxylic acids, such as acrylonitrile, methacrylonitrile, fumaronitrile, maleonitrile, and conjugated $C_{4-8}$-dienes, such as 1,3-butadiene (butadiene) and isoprene. Said monomers form as a rule the main monomers, which, based on the total amount of monomers M2, together account for a proportion of $\geq 50\%$ by weight, preferably $\geq 80\%$ by weight and in particular $\geq 90\%$ by weight. As a rule, these monomers have only a moderate to low solubility in water under standard conditions (20° C., 1 atm (absolute)).

Monomers M2 which have a higher water solubility under the abovementioned conditions are those which comprise either at least one acid group and/or the corresponding anion thereof or at least one amino, amido, ureido or N-heterocyclic group and/or the ammonium derivatives thereof which are protonated or alkylated on the nitrogen. $\alpha,\beta$-Monoethylenically unsaturated mono- and dicarboxylic acids having 3 to 6 carbon atoms and the amides thereof may be mentioned by way of example, such as, for example, acrylic acid, methacrylic acid, maleic acid, fumaric acid, itaconic acid, acrylamide and methacrylamide; furthermore vinylsulfonic acid, 2-acrylamido-2-methylpropanesulfonic acid, styrenesulfonic acid and the water-soluble salts thereof and N-vinylpyrrolidone, 2-vinylpyridine, 4-vinylpyridine, 2-vinylimidazole, 2-(N,N-dimethylamino)ethyl acrylate, 2-(N,N-dimethylamino)ethyl methacrylate, 2-(N,N-diethylamino) ethyl acrylate, 2-(N,N-diethylamino)ethyl methacrylate, 2-(N-tert-butylamino)ethyl methacrylate, N-(3-N',N'-dimethylaminopropyl)methacrylamide, 2-(1-imidazolin-2-onyl) ethyl methacrylate and ureido methacrylate. Usually, the abovementioned water-soluble monomers M2 are present only as modifying monomers in amounts of $\leq 10\%$ by weight, preferably $\leq 5\%$ by weight and particularly preferably $\leq 3\%$ by weight, based on the total amount of monomers M2.

Monomers M2, which usually increase the internal strength of the films of a polymer matrix, usually have at least one N-methylol or carbonyl group or at least two nonconjugated ethylenically unsaturated double bonds. Examples of these are monomers having two vinyl radicals, monomers having two vinylidene radicals and monomers having two alkenyl radicals. Particularly advantageous are the diesters of dihydric alcohols with $\alpha,\beta$-monoethylenically unsaturated monocarboxylic acids, among which acrylic and methacrylic acid are preferred. Examples of such monomers having two nonconjugated ethylenically unsaturated double bonds are alkenyl glycol diacrylates and dimethacrylates, such as ethylene glycol diacrylate, 1,2-propylene glycol diacrylate, 1,3-propylene glycol diacrylate, 1,3-butylene glycol diacrylate, 1,4-butylene glycol diacrylates and ethylene glycol dimethacrylate, 1,2-propylene glycol dimethacrylate, 1,3-propylene glycol dimethacrylate, 1,3-butylene glycol dimethacrylate, 1,4-butylene glycol dimethacrylate, and divinylbenzene, vinyl methacrylate, vinyl acrylate, allyl methacrylate, allyl acrylate, diallyl maleate, diallyl fumarate, methylenebisacrylamide, cyclopentadienyl acrylate, triallyl cyanurate or triallyl isocyanurate. Compounds such as diacetoneacrylamide and acetylacetoxyethyl acrylate or methacrylate are also of importance in this context. Frequently, the abovementioned crosslinking monomers M2 are used in amounts of $\leq 10\%$ by weight, preferably in amounts of $\leq 5\%$ by weight and particularly preferably in amounts of $\leq 3\%$ by weight, based in each case on the total amount of monomers A2. Frequently, however, no such crosslinking monomers M2 are used at all.

According to the invention, it is possible, if necessary, initially to take a portion of the total amount of monomers M2 in the polymerization vessel. However, it is also possible to meter in the total amount or any remaining residual amount of monomers M2 during the polymerization reaction. The total amount or any remaining residual amount of monomers M2 can be metered into the polymerization vessel batchwise in one or more portions or continuously at constant or varying flow rates. Particularly advantageously, the metering of the monomers M2 during the polymerization reaction is effected continuously at constant flow rates, in particular as constituent of an aqueous monomer emulsion.

For the preparation of the aqueous dispersion of the component (II), dispersants which keep both the monomer droplets and the polymer particles obtained by the free radical polymerization dispersed in the aqueous phase and thus ensure the stability of the aqueous polymer composition produced are frequently concomitantly used. Both the protective colloids usually used for carrying out free radical aqueous emulsion polymerizations and emulsifiers are suitable as such.

Suitable protective colloids are, for example, polyvinyl alcohols, cellulose derivatives or copolymers comprising vinylpyrrolidone. A detailed description of further suitable protective colloids is to be found in Houben-Weyl, Methoden der organischen Chemie, Volume XIV/1, Makromolekulare Stoffe, pages 411 to 420, Georg-Thieme-Verlag, Stuttgart, 1961.

It is of course also possible to use mixtures of emulsifiers and/or protective colloids. Frequently, exclusively emulsifiers whose relative molecular weights, in contrast to the protective colloids, are usually below 1000 are used as dispersants. They may be anionic, cationic or nonionic. Of course, in the case of the use of mixtures of surface-active substances, the individual components must be compatible with one another, which can be checked by a few preliminary experiments in case of doubt. In general, anionic emulsifiers are compatible with one another and with nonionic emulsifiers.

The same also applies to cationic emulsifiers, while anionic and cationic emulsifiers are generally not compatible with one another.

Customary emulsifiers are, for example, ethoxylated mono-, di- and trialkylphenols (degree of ethoxylation: 3 to 50, alkyl radical: $C_4$ to $C_{12}$), ethoxylated fatty alcohols (degree of ethoxylation: 3 to 50; alkyl radical: $C_8$ to $C_{36}$) and alkali metal and ammonium salts of alkylsulfates (alkyl radical: $C_8$ to $C_{12}$), of sulfuric acid monoesters of ethoxylated alkanols (degree of ethoxylation: 3 to 30, alkyl radical: $C_{12}$ to $C_{18}$) and of ethoxylated alkylphenols (degree of ethoxylation: 3 to 50, alkyl radical: $C_4$ to $C_{12}$), of alkanesulfonic acids (alkyl radical: $C_{12}$ to $C_{18}$) and of alkylarylsulfonic acids (alkyl radical: $C_9$ to $C_{18}$). Further suitable emulsifiers are described in Houben-Weyl, Methoden der organischen Chemie, Volume XIV/1, Makromolekulare Stoffe, pages 192 to 208, Georg-Thieme-Verlag, Stuttgart, 1961.

Nonionic and/or anionic emulsifiers are preferably used for the process according to the invention.

As a rule, the amount of dispersant used, in particular emulsifiers, is from 0.1 to 5% by weight, preferably from 1 to 3% by weight, based in each case on the total amount of the monomer mixture M.

According to the invention, it is possible, if necessary, initially to take a portion of the total amount of dispersant in the polymerization vessel. However, it is also possible to meter in the total amount or any remaining residual amount of dispersant during the polymerization reaction. The total amount or any remaining residual amount of dispersant can be metered into the polymerization vessel batchwise in one or more portions or continuously at constant or varying flow rates. Particularly advantageously, the metering of the dispersants during the polymerization reaction is effected continuously at constant flow rates, in particular as a constituent of an aqueous monomer emulsion.

Preferred polymers M comprise a) from 0.01 to 50% by weight of at least one ethylenically unsaturated monomer which comprises at least one epoxide group and/or at least one hydroxyalkyl group (monomer(s) M1) and b) from 50 to 99.99% by weight of at least one further ethylenically unsaturated monomer which differs from the monomers M1 (monomer(s) M2).

Particularly preferred polymers M of this type are obtainable by free radical solution polymerization of from 10 to 30% by weight, preferably from 15 to 22% by weight, of acrylic acid esters and/or methacrylic acid esters of $C_{1-8}$-alcohols—preferably methanol, n-butanol, 2-ethylhexanol—with from 40 to 70% by weight, preferably from 55 to 65% by weight of styrene and from 5 to 50% by weight, preferably from 20 to 30% by weight, of 2-hydroxyethyl acrylate and/or 2-hydroxyethyl methacrylate and/or glycidyl acrylate and/or glycidyl methacrylate, the sum of the components being 100% by weight.

Further preferred polymers M comprise no monomer(s) M1 and are obtainable by free radical solution polymerization of from 80 to 99% by weight, preferably from 85 to 95% by weight, of acrylic acid esters and/or methacrylic acid esters of $C_{1-8}$-alcohols—preferably methanol, n-butanol, 2-ethylhexanol—with from 0 to 5% by weight, preferably from 1 to 3% by weight, of ureido methacrylate and from 0.5 to 5% by weight, preferably from 1 to 4% by weight, of α,β-monoethylenically unsaturated mono- and dicarboxylic acids having 3 to 6 carbon atoms—preferably acrylic acid, methacrylic acid—and/or amides of these acids, the sum of the components being 100% by weight.

Such polymers preferably have a core/shell morphology (isotropic distribution of the phases, for example in the form of onion skins) of a Janus morphology (anisotropic distribution of the phases).

By targeted variation of type and amount of the monomers M1 and M2, it is possible, according to the invention, for the person skilled in the art to prepare aqueous polymer compositions whose polymers M have a glass transition temperature $T_g$ or a melting point in the range from −60 to 270° C.

Advantageously, the glass transition temperature $T_g$ of the polymer M is in the range from 10° C. to 120° C. and preferably in the range from 40° C. to 80° C.

The glass transition temperature $T_g$ is the limit of the glass transition temperature toward which the glass transition temperature tends according to G. Kanig (Kolloid-Zeitschrift & Zeitschrift für Polymere, Vol. 190, page 1, equation 1) with increasing molecular weight. The glass transition temperature or the melting point is determined by the DSC method (differential scanning calorimetry, 20 K/min, midpoint measurement, DIN 53765).

The $T_g$ values for the homopolymers of most monomers are known and are listed, for example, in Ullmann's Encyclopedia of Industrial Chemistry, Part 5, Vol. A21, page 169, VCH Weinheim, 1992; further sources of glass transition temperatures of homopolymers are, for example, J. Brandrup, E. H. Immergut, Polymer Handbook, $1^{st}$ Ed., J. Wiley, New York 1966, $2^{nd}$ Ed., J. Wiley, New York 1975, and $3^{rd}$ Ed., J. Wiley, New York 1989).

The components (I) and (II) according to the invention usually have polymer solids contents (total amount of polymer A or total amount of polymer M) of ≧10 and ≦70% by weight, frequently ≧20 and ≦65% by weight and often ≧40 and ≦60% by weight, based on the respective aqueous component (I) or (II).

The number average particle diameter (cumulant z-average), determined by quasielastic light scattering (ISO standard 13321), of the polymer M of the aqueous component (II) is as a rule from 10 to 2000 nm, frequently from 20 to 1000 nm and often from 50 to 700 nm or from 80 to 400 nm.

The weight average of polymer A:polymer M is in the range from 1:10 to 10:1, preferably in the range from 3:1 to 1:3, particularly preferably in the range from 3:2 to 2:3. The weight data is based in each case on the pure, undiluted substances or on the solid.

The pH of the binder B is in the range from 0 to 4, preferably in the range from 1.5 to 3. The desired pH of the binder B is established as a rule by the combination of the components (I) and (II) and optionally component (III).

The pH of the binder B at the place of action can, however, be adjusted in the usual manner by addition of inorganic or organic acids, for example mineral acids, such as sulfuric acid or hydrochloric acid, organic sulfonic acids, carboxylic acids, such as formic acid or acetic acid, or inorganic or organic bases, for example sodium hydroxide (aqueous or as such), calcium oxide or calcium carbonate (in each case aqueous or as such) or ammonia, aqueous or as such, to the desired value in the range from 0 to 4, preferably in the range from 1.5 to 3.

In general, the ready-mixed binder B having the above-mentioned pH range can be used. The desired pH—as described above—can, however, also be established by applying the individual components of the binder B and the acids or bases described above separately to the lignocellulose-containing substrate. By the choice of the pH of the components of the binder B and of the added acids or bases, the person skilled in the art can combine these so that the desired pH is established on the lignocellulose-containing substrate.

The term additives as component (III) is to be understood as meaning all additives known to the person skilled in the art, for example waxes, paraffin emulsion, flame-retardant additives, wetting agents, salts. These additives can be added in an amount of from 0 to 20% by weight, preferably from 0 to 5% by weight, in particular from 0 to 1% by weight, based on the solids content of the lignocellulose-containing substrate A, for example absolutely dry wood.

The lignocellulose-containing material is as a rule obtained by bringing the lignocellulose particles A, preferably wood particles A, into contact with the binder B. Such so-called glue application methods are known for the production of conventional wood-base materials with customary aminoplast resins and are described, for example, in "Taschenbuch der Spanplatten Technik", H.-J. Deppe, K. Ernst, 4$^{th}$ Edition, 2000, DRW-Verlag Weinbrenner GmbH & Co., Leinfelden-Echterdingen, Chapter 3.3.

The binder B can be brought into contact with the lignocellulose particles A, preferably the wood particles A, in various ways, preferably by spraying B onto A.

The binder B can be brought into contact in ready-mixed form with A, preferably sprayed on. However, the components (I) and (II) and optionally (III) can also be brought into contact in unmixed form, i.e. separately, with A, preferably sprayed on. The last-mentioned variant is possible, for example, if the components (I) and (II) and optionally (III) undergo undesired chemical reactions and/or undesired physical changes, for example coagulation or flocculation, in the prepared mixture.

In the glue application, the binder mixture according to the invention is usually used in an amount such that advantageously from 0.1 to 50 g, preferably from 0.1 to 30 g, particularly preferably from 0.5 to 15 g and in particular from 3 to 10 g of binder are used per 100 g of absolutely dry fibers or chips.

Furthermore, the present invention relates to moldings comprising a lignocellulose-containing material obtainable by treating lignocellulose A with a binder B as described above. Such moldings are referred to below as moldings according to the invention; they may assume a regular or irregular three-dimensional shape, for example a sphere or cuboid. Preferred moldings according to the invention are sheet-like, particularly preferably in the form of a board.

Further moldings according to the invention are those in which the lignocellulose-containing material is wood, also referred to below as wood-base materials according to the invention. These may assume a regular or irregular three-dimensional shape, for example a sphere or cuboid. Preferred wood-base materials according to the invention are sheet-like, particularly preferably in the form of a board.

The production of the moldings according to the invention, preferably of the wood-base materials according to the invention, is effected in the customary method, as described, for example, in "Taschenbuch der Spanplatten Technik" H.-J. Deppe, K. Ernst, 4$^{th}$ Edition, 2000, DRW-Verlag Weinbrenner GmbH & Co., Leinfelden-Echterdingen, Chapter 3.5.

Usually, the lignocellulose-containing material according to the invention, preferably wood, for example in the form of fibers, chips, veneers or strands, is prepared as described above.

Thereafter, the lignocellulose-containing material according to the invention, preferably wood, for example in the form of fibers, chips, veneers or strands, is pressed by a customary method to give moldings according to the invention, preferably wood-base materials according to the invention.

For this purpose, a fiber/particle mat is usually produced by sprinkling the lignocellulose-containing material according to the invention—preferably wood, particularly preferably wood in the form of chips or fibers—onto a substrate and said mat is usually pressed at temperatures of from 80° C. to 250° C. and at pressures of from 5 to 50 bar to give moldings according to the invention, preferably wood-base materials according to the invention (cf. for example: "Taschenbuch der Spanplatten Technik" H.-J. Deppe, K. Ernst, 4$^{th}$ Edition, 2000, DRW-Verlag Weinbrenner GmbH & Co., Leinfelden-Echterdingen, pages 232-254 and "MDF—Mitteldichte Faserplatten", H.-J. Deppe, K. Ernst, 1996, DRW-Verlag Weinbrenner GmbH & Co., Leinfelden-Echterdingen, pages 93-104). The pressing times in the case of boards is as a rule from 7 to 40 sec/mm board thickness, preferably in the range from 12 to 26 sec/mm board thickness.

All materials which are produced from wood strips, for example veneer boards or plywood boards, wood-base materials produced from wood chips, for example particle boards or OSP boards, and wood fiber materials, such as LDF, MDF and HDF boards, are particularly preferred wood-base materials according to the invention.

Advantageously, formaldehyde-free wood-base materials comprising binders are produced by the process according to the invention. OSB boards, wood fiber boards and particle boards are preferred.

The present invention furthermore relates to the use of the moldings according to the invention, preferably of the wood-base materials according to the invention, for the production of pieces of furniture, of packaging materials, in house construction, in drywall construction or in interior finishing, for example as laminate, insulating material, wall or ceiling elements, or in motor vehicles.

Examples

1. Components (I) and (II)

The component (I) was a commercially available aqueous solution of a polymer A according to the invention, obtainable by free radical solution polymerization of 70% by weight of acrylic acid and 30% by weight of maleic anhydride in water. The component (I) comprised no further crosslinking component, such as polyalkanolamines, for example triethanolamine. The weight average molecular weight Mw was 80,000 g/mol. The solids content was 45% by weight.

The component (II) was a commercially available aqueous dispersion of a polymer M according to the invention, obtainable by free radical emulsion polymerization of 59% by weight of styrene and 12% by weight of methyl methacrylate, 5% by weight of n-butyl acrylate, 16% by weight of hydroxyethyl acrylate and 8% by weight of glycidyl methacrylate in water. The particle size was on average 140 nm. The pH was 1.9. The solids content was 46% by weight.

2. List of the Binder Compositions Used

BM1: Component (I) described under 1. with 30% by weight triethanolamine.

BM2 and BM3: Polymer composition comprising polyacrylic acid/styrene-plus-acrylate-based copolymer dispersion prepared according to WO 2007/122089 A1.

BM4: 1:1 mixture according to the invention (based on the respective solids content) of components (I) and (II) described under 1.: pH=2.0, $T_g$=60° C.

BM5: Commercially available UF glue (urea-formaldehyde glue).

BM6 and BM7: 1:1 mixture according to the invention (based on the respective solids content) comprising components (I) and (II): pH=2.0; for BM6: $T_g$=30° C.; and for BM7: $T_g$=10° C. BM6 and BM7 have the same composition qualitatively as the component (II) described under 1. but differ in the glass transition temperature $T_g$.

BM8: 6:4 mixture (based on the respective solids content) according to the invention, comprising components (I) and (II) described under 1.: pH=2.0, $T_g$=60° C.

BM9: mixture according to the invention comprising BM8 plus 10% by weight of saccharose (based on the sum of the solids content of the components (I) and (II) in BM8)

3. Methods of Measurements and Results of Measurements

The transverse tensile strength was determined according to EN 319.

The swelling values were determined according to EN 317. The results are listed in tables 1 and 2b, 2c.

4. Production and Testing of the Wood-Base Materials According to the Invention 4.1 Production of Mini-Particle Boards and Testing Thereof for Swelling 174 g of spruce chips (conditioned at 20° C., 65% relative humidity) were treated with the corresponding amount of binder (cf. table 1, column headed glue application; the amounts of binder solid, based on absolutely dry wood, are stated) in an Eirich mixer and pressed in molds (50 mm×50 mm×19 mm) with 40 kN at 190° C. The pressing times are stated in the table.

The swelling value, in particular the thickness swelling, was determined after incubation in water at 20° C. after 2 h as stated relative to the original thickness of the moldings.

The results of these experiments are shown in table 1.

TABLE 1

Swelling values of mini-particle boards

| Binder | Pressing time [s/mm] | Glue application [% by wt. absolutely dry] | Swelling value (after 2 h) |
|---|---|---|---|
| BM1 | 15 | 9% | no bonding [a] |
| BM2 | 15 | 9% | 14% |
| BM3 | 15 | 9% | 11% |
| BM4 (invention) | 9 | 6% | 11% |
| BM4 (invention) | 10.5 | 6% | 10% |
| BM4 (invention) | 12 | 6% | 9% |

[a] It was not possible to produce a board, the wood chips crumbled.

The swelling value experiments show that, even with application of little glue and with a relatively short pressing time, the binder composition according to the invention is superior to other formaldehyde-free glues, such as BM1 or those prepared according to WO 2007/122089 A1 (B2 and BM3).

4.2 Production of Laboratory Particle Boards and Testing Thereof for Transverse Tension and Swelling Laboratory particle boards were produced analogously to conventional aminoplast resin-containing particle boards. A press plate was not used but release paper was employed. The test specimens for the transverse tensile strength and the swelling values were taken from the same board in each case. Further details are shown in table 2a.

TABLE 2a

Parameters for the production of the laboratory particle boards

| Experiment → | Dimension | 1 (comparison) | 2 | 3 |
|---|---|---|---|---|
| Binder → | — | BM5 | BM6 | BM7 |
| Weight of chips taken: absolutely dry/glue-coated | g | 500/530 | 500/530 | 500/530 |
| Chip type-spruce (u = 2.6%) | — | B chips | B chips | B chips |
| Solid resin glue | % by wt. | 67.0 | 46.0 | 46.0 |
| Solid resin glue in liquor | % by wt. | 50.0 | 43.8 | 43.8 |
| Solid resin on absolutely dry chips | % by wt. | 9.0 | 9.0 | 9.0 |
| Spray on glue liquor | g | 90.0 | 102.7 | 102.7 |
| Chip moisture, glue-coated | % by wt. | 9.7 | 11.7 | 12.1 |
| Pressing pressure (profile) | N/mm² | 4/2/1 | 4/2/1 | 4/2/1 |
| Pressing time (profile) at 210° C. | s | 60/30/120 | 60//30/120 | 60//30/120 |

TABLE 2b

Measurement of the transverse tensile strength

| Experiment → | Dimension | 1 (comparison) | 2 | 3 |
|---|---|---|---|---|
| Binder → | — | BM5 | BM6 | BM7 |
| Thickness in test | mm | 8.7 | 8.7 | 8.7 |
| Density [a] | kg/m³ | 621 | 581 | 572 |
| Standard deviation of density | +/− kg/m³ | 44.9 | 44.7 | 51.7 |
| Transverse tensile strength V20 | N/mm² | 0.60 | 0.38 | 0.39 |
| Standard deviation of transverse tensile strength | +/− N/mm² | 0.1 | 0.09 | 0.09 |

[a] Mean value of 8 measurements

TABLE 2c

Measurement of the swelling [a]

| Experiment → | Dimension | 1 (comparison) | 2 | 3 |
|---|---|---|---|---|
| Binder → | — | BM5 | BM6 | BM7 |
| Thickness in test | mm | 8.7 | 8.7 | 8.7 |
| Density [b] | kg/m³ | 639 | 595 | 586 |
| Standard deviation of density | +/− kg/m³ | 29.3 | 41.4 | 46.3 |
| Swelling after 2 h | % | 25.0 | 18.9 | 20.5 |
| Standard deviation of swelling after 2 h | +/− % | 2.4 | 1.5 | 0.7 |
| Swelling after 24 h | % | 28.2 | 21.8 | 24.4 |
| Standard deviation of swelling after 24 h | +/− % | 2.7 | 1.9 | 1.4 |

[a] Board section of 50 × 50 mm. The swelling, in particular the thickness swelling, was determined after incubation in water at 20° C. for 2 h or 24 h and stated relative to the original thickness of the moldings.
[b] Mean value of 7 measurements The experiments show that the transverse tensile strength of the boards according to the invention (experiments 2 and 3) is somewhat lower than that of particle boards based on aminoplast resin glues (experiment 1, comparison). However, the transverse tensile strength of the boards according to the invention fulfils the standard for conventional particle boards (comparative value of transverse tensile strength of conventional particle board=0.4 at a density of 650 kg/m³).

In the balance of transverse tensile strength and swelling value, the boards according to the invention are superior to the particle boards based on aminoplast resin glues (experiment 1, comparison): lower swelling values with still good transverse tensile strength.

4.3 Preparation of Laboratory Thin MDF Boards and Testing Thereof for Transverse Tension 3 mm thick medium-density fiber boards were produced analogously to conventional aminoplast resin-containing fiber boards on the pilot scale (30 cm×30 cm). The wood fibers were coated with about 6% by weight of absolutely dry binder BM8 or BM9 in a Lödige mixer.

The test specimens for the transverse tensile strength and the swelling values were taken from the same board in each case. Further details appear in Table 3.

TABLE 3

Measured values of the test specimens produced with BM8 and BM9

| Binder | Total content of saccharose [a] [% by weight] | Required thickness mm | Pressing time s | Thickness mm | Density kg/m³ | Transverse tensile strength N/mm² | Relative |
|---|---|---|---|---|---|---|---|
| BM8 | 0 | 3 | 24 | 3.5 | 664 | 0.26 | 100% |
|  |  |  | 30 | 3.5 | 660 | 0.28 | 100% |
|  |  |  | 36 | 3.5 | 643 | 0.26 | 100% |
|  |  |  | 60 | 3.4 | 660 | 0.29 | 100% |
| BM9 | 9 |  | 24 | 3.4 | 661 | 0.32 | 123% |
|  |  |  | 30 | 3.3 | 685 | 0.38 | 138% |
|  |  |  | 36 | 3.3 | 665 | 0.35 | 135% |
|  |  |  | 60 | 3.4 | 668 | 0.40 | 137% |

[a] Proportion of saccharose [% by weight] in the total mixture comprising component (I) + component (II) + saccharose, based on the respective solids content.

The experiments show that the transverse tensile strength of the fiber boards according to the invention can be increased by more than 20% by addition of 10% by weight (based on the solids content of the binder) of a component (ii) saccharose.

The invention claimed is:

1. A lignocellulose-containing material, obtainable by treating lignocellulose particles A with a binder B, the binder B comprising the following components:
   An aqueous component (I) comprising
   (i) a polymer A which is composed of the following monomers:
      a) from 80 to 100% by weight of at least one ethylenically unsaturated mono- and/or dicarboxylic acid (monomer(s) A1) and
      b) from 0 to 20% by weight of at least one further ethylenically unsaturated monomer which differs from the monomers A1 (monomer(s) A2)
   and
   (ii) a crosslinking agent with a molecular weight from 30 to 500 g/mol having at least two functional groups which are selected from the group consisting of hydroxyl, carboxylic acid and derivatives thereof, primary, secondary and tertiary amine, epoxy
   and a component (II) as an aqueous dispersion comprising one or more polymer(s) M which are composed of the following monomers:
      a) from 0 to 50% by weight of at least one ethylenically unsaturated monomer which comprises at least one epoxide group and/or at least one hydroxyalkyl group (monomer(s) M1), and
      b) from 50 to 100% by weight of at least one further ethylenically unsaturated monomer which differs from the monomers M1 (monomer(s) M2)
   and optionally additives as component (III).

2. A lignocellulose-containing material, obtainable by treating lignocellulose particles A with a binder B, the binder B comprising the following components:
   An aqueous component (I) comprising
   (i) a polymer A which is composed of the following monomers:
      a) from 80 to 100% by weight of at least one ethylenically unsaturated mono- and/or dicarboxylic acid (monomer(s) A1) and
      b) from 0 to 20% by weight of at least one further ethylenically unsaturated monomer which differs from the monomers A1 (monomer(s) A2)
   and
   (ii) a crosslinking agent with a molecular weight from 30 to 500 g/mol having at least two functional hydroxyl groups
   and a component (II) as an aqueous dispersion comprising one or more polymer(s) M which are composed of the following monomers:
      a) from 0 to 50% by weight of at least one ethylenically unsaturated monomer which comprises at least one epoxide group and/or at least one hydroxyalkyl group (monomer(s) M1), and
      b) from 50 to 100% by weight of at least one further ethylenically unsaturated monomer which differs from the monomers M1 (monomer(s) M2)
   and optionally additives as component (III).

3. A lignocellulose-containing material, obtainable by treating lignocellulose particles A with a binder B, the binder B comprising the following components:
   An aqueous component (I) comprising
   (i) a polymer A which is composed of the following monomers:
      a) from 80 to 100% by weight of at least one ethylenically unsaturated mono- and/or dicarboxylic acid (monomer(s) A1) and
      b) from 0 to 20% by weight of at least one further ethylenically unsaturated monomer which differs from the monomers A1 (monomer(s) A2)
   and a component (II) as an aqueous dispersion comprising one or more polymer(s) M which are composed of the following monomers:
  a) from 0 to 50% by weight of at least one ethylenically unsaturated monomer which comprises at least one epoxide group and/or at least one hydroxyalkyl group (monomer(s) M1), and
  b) from 50 to 100% by weight of at least one further ethylenically unsaturated monomer which differs from the monomers M1 (monomer(s) M2)
and a crosslinking agent (ii) with a molecular weight of from 30 to 500 g/mol having at least two functional hydroxyl groups and optionally additives as component (III).

4. The lignocellulose-containing material according to claim 1, the lignocellulose particles A comprising wood.

5. The lignocellulose-containing material according to claim 1, the weight ratio of polymer A:polymer M being in the range from 1:10 to 10:1.

6. A molding comprising the lignocellulose-containing material as claimed in claim 1.

7. The molding according to claim 6, in the form of a board.

8. The molding according to claim 7, the board being a particle board, fiber board or an oriented strand board (OSB).

9. A process for the production of the lignocellulose-containing material as claimed in claim 1, in which comprises contacting lignocellulose particles A with the binder B.

10. The process according to claim 9, wherein the contacting comprises spraying of B onto A.

11. A process for the production of moldings as claimed in claim 6 which comprises compressing the lignocellulose-containing material and shaping.

12. A production of pieces of furniture and of packaging materials, in house construction or in interior finishing or in motor vehicles which comprises utilizing the molding as claimed in claim 6.

13. The lignocellulose-containing material according to claim 2, the lignocellulose particles A comprising wood.

14. The lignocellulose-containing material according to claim 2, the weight ratio of polymer A:polymer M being in the range from 1:10 to 10:1.

15. A molding comprising the lignocellulose-containing material as claimed in claim 2.

16. The lignocellulose-containing material according to claim 3, the lignocellulose particles A comprising wood.

17. The lignocellulose-containing material according to claim 3, the weight ratio of polymer A:polymer M being in the range from 1:10 to 10:1.

18. A molding comprising the lignocellulose-containing material as claimed in claim 3.

* * * * *